(12) United States Patent
Soltys et al.

(10) Patent No.: US 8,474,348 B2
(45) Date of Patent: Jul. 2, 2013

(54) PEDAL ASSEMBLY FOR ELECTRONIC BRAKING SYSTEM

(75) Inventors: Jarek Soltys, Chatham (CA); Nack J. Sung, Chatham (CA)

(73) Assignee: KSR Technologies Co., Ridgetown (CA)

( * ) Notice: Subject to any disclaimer, the term of this patent is extended or adjusted under 35 U.S.C. 154(b) by 0 days.

(21) Appl. No.: 13/021,288

(22) Filed: Feb. 4, 2011

(65) Prior Publication Data

US 2011/0185843 A1    Aug. 4, 2011

Related U.S. Application Data

(60) Provisional application No. 61/337,500, filed on Feb. 4, 2010.

(51) Int. Cl.
| | |
|---|---|
| *B60T 7/06* | (2006.01) |
| *B60T 11/18* | (2006.01) |
| *B60T 7/04* | (2006.01) |
| *G05G 1/36* | (2008.04) |
| *G05G 5/03* | (2008.04) |

(52) U.S. Cl.
CPC .............. B60T 11/18 (2013.01); *B60T 7/042* (2013.01); *G05G 1/36* (2013.01); *G05G 5/03* (2013.01)
USPC .............................................. 74/512; 74/560

(58) Field of Classification Search
USPC ............ 74/512, 513, 514, 560, 567; 267/205, 267/206, 208, 215, 223, 211, 216, 214
See application file for complete search history.

(56) References Cited

U.S. PATENT DOCUMENTS

| | | | |
|---|---|---|---|
| 3,388,610 A | 6/1968 | Pyle et al. | |
| 3,646,831 A * | 3/1972 | Janosi | 74/518 |
| 3,678,779 A * | 7/1972 | Janosi | 74/516 |
| 4,875,385 A | 10/1989 | Sitrin | |
| 5,460,061 A | 10/1995 | Redding et al. | |
| 5,615,749 A | 4/1997 | Kato | |
| 5,848,558 A | 12/1998 | Isono et al. | |

(Continued)

FOREIGN PATENT DOCUMENTS

| | | |
|---|---|---|
| DE | 19733512 A1 | 2/1999 |
| DE | 602004003782 T2 | 10/2007 |

(Continued)

*Primary Examiner* — James Pilkington
*Assistant Examiner* — Richard Urbanski
(74) *Attorney, Agent, or Firm* — Gifford, Krass, Sprinkle, Anderson & Citkowski, P.C.

(57) ABSTRACT

An electrical-mechanical brake apparatus includes a bracket (20) and a pedal arm (40) supported by the bracket (20). One of the bracket (20) and the pedal arm (40) presents a cam body (72). The other of the other of the pedal arm (40) and the bracket (20) presents a cam follower (64). One of the cam body (72) and the cam follower (64) is rotatable. A cam bias (86) interconnects the rotatable one of the cam body (72) and the cam follower (64) to one of the bracket (20) and the pedal arm (40). As the pedal arm (40) moves toward the bracket (20), the cam follower (64) moves along the cam body (72), compressing the cam bias (86) for simulating the feel of a purely mechanical brake system. In certain embodiments, the bracket (20) presents the cam body (72) while in other embodiments the pedal arm (40) presents the cam body. In certain embodiments, the cam body (72) rotates while in others the cam follower (64) rotates.

7 Claims, 10 Drawing Sheets

U.S. PATENT DOCUMENTS

| | | | |
|---|---|---|---|
| 5,996,439 A * | 12/1999 | Elton et al. ................... 74/512 |
| 6,006,626 A | 12/1999 | Notake et al. | |
| 6,070,488 A | 6/2000 | Yabusaki et al. | |
| 6,089,342 A | 7/2000 | Muller et al. | |
| 6,216,580 B1 * | 4/2001 | Kobayashi et al. ......... 91/376 R |
| 6,339,971 B1 | 1/2002 | Kato | |
| 6,408,711 B1 | 6/2002 | Mizuma et al. | |
| 6,481,311 B1 | 11/2002 | Sanagi et al. | |
| 6,516,683 B2 * | 2/2003 | Sundaresan et al. ............ 74/560 |
| 6,571,659 B2 | 6/2003 | Choi | |
| 6,655,489 B2 | 12/2003 | Kawai et al. | |
| 6,701,800 B2 | 3/2004 | Saitou et al. | |
| 6,708,792 B2 | 3/2004 | Hirata | |
| 6,786,109 B2 | 9/2004 | Mueller et al. | |
| 7,055,404 B2 * | 6/2006 | Burgstaler et al. ............. 74/512 |
| 7,077,028 B2 | 7/2006 | Misonou et al. | |
| 7,090,046 B2 | 8/2006 | Nebuya et al. | |
| 7,240,581 B2 | 7/2007 | Lee | |
| 7,267,194 B2 | 9/2007 | Miyoshi | |
| 7,415,909 B2 | 8/2008 | Miyoshi et al. | |
| 7,434,648 B2 | 10/2008 | Hayashi | |
| 7,516,683 B2 | 4/2009 | Jasseron | |
| 2004/0259687 A1 | 12/2004 | Ritter et al. | |
| 2005/0050980 A1 | 3/2005 | Park | |
| 2005/0082909 A1 * | 4/2005 | Constantakis et al. .......... 303/20 |
| 2005/0145057 A1 | 7/2005 | Fujiwara | |
| 2005/0166703 A1 * | 8/2005 | Djordjevic ..................... 74/512 |
| 2005/0172753 A1 | 8/2005 | Fujiwara | |
| 2005/0252334 A1 | 11/2005 | Podkopayev | |
| 2007/0000708 A1 | 1/2007 | Himetani | |
| 2007/0227289 A1 | 10/2007 | Choi et al. | |
| 2007/0266815 A1 | 11/2007 | Johansson | |
| 2008/0000709 A1 | 1/2008 | Tanigawa et al. | |
| 2008/0303340 A1 | 12/2008 | Crombez et al. | |
| 2009/0000418 A1 * | 1/2009 | Kim et al. ....................... 74/512 |
| 2009/0235777 A1 | 9/2009 | Sand et al. | |
| 2011/0083528 A1 * | 4/2011 | Osawa et al. .................. 74/513 |
| 2012/0167708 A1 * | 7/2012 | Brandt et al. .................. 74/513 |

FOREIGN PATENT DOCUMENTS

| | | |
|---|---|---|
| EP | 0659615 A1 | 6/1995 |
| EP | 0827874 A2 | 3/1998 |
| EP | 0827885 A1 | 3/1998 |
| EP | 0847900 A1 | 6/1998 |
| EP | 0928727 A2 | 7/1999 |
| EP | 1074445 A2 | 2/2001 |
| EP | 1260419 A1 | 11/2002 |
| EP | 1308357 A1 | 5/2003 |
| EP | 1318051 A2 | 6/2003 |
| EP | 1323602 A1 | 7/2003 |
| EP | 1371525 A2 | 12/2003 |
| EP | 1510426 A2 | 3/2005 |
| EP | 1557330 A2 | 7/2005 |
| EP | 1600344 A1 | 11/2005 |
| EP | 1980460 A1 | 10/2008 |
| EP | 2276257 A1 | 1/2011 |
| EP | 2276556 A1 | 1/2011 |
| ES | 2276257 T3 | 6/2007 |
| ES | 2276556 A1 | 6/2007 |
| FR | 2843569 A1 | 2/2004 |
| FR | 2885574 A1 | 11/2006 |
| FR | 2899174 A1 | 10/2007 |
| GB | 0010432.3 A | 3/1917 |
| GB | 2353009 A | 2/2001 |
| JP | 3269372 A | 11/1991 |
| JP | 9216528 A | 8/1997 |
| JP | 11043073 A | 2/1999 |
| JP | 11059350 A | 3/1999 |
| JP | 2000280874 A | 10/2000 |
| JP | 2003191829 A | 7/2003 |
| JP | 2004249959 A | 9/2004 |
| JP | 2004334889 A | 11/2004 |
| KR | 100410780Q B1 | 12/2003 |
| KR | 20020022675 B1 | 12/2003 |
| WO | 02081277 A1 | 10/2002 |
| WO | 03062029 A1 | 7/2003 |
| WO | 2005/049389 A1 | 6/2005 |
| WO | 2005/078547 A1 | 8/2005 |
| WO | 2008142193 A1 | 11/2008 |
| WO | 2011021094 A1 | 2/2011 |

* cited by examiner

PEDAL ASSEMBLY FOR ELECTRONIC BRAKING SYSTEM

CROSS REFERENCE TO RELATED APPLICATION

This application claims the benefit of application Ser. No. 61/337,500 filed Feb. 4, 2010. This application also claims priority to U.S. patent application Ser. No. 12/858,766 filed Aug. 18, 2010.

BACKGROUND OF THE INVENTION

1. Field of the Invention

An apparatus for simulating the feel of a purely mechanical brake system.

2. Description of the Prior Art

Electrical-mechanical systems for simulating the feel of a purely mechanical brake system are well known in the prior art. These systems are used, for example, with "brake-by-wire" technology. In "brake-by-wire," the braking force is correlated with data from a sensor that tracks the position of a brake pedal instead of in a purely mechanical system where the force of the vehicle' operators foot on the brake pedal contributes to the fluid pressure in a master cylinder.

For example, U.S. Pat. No. 7,748,792 to Crombez et al. discloses a system for simulating the feel of a mechanical system when the vehicle is operated in "brake-by-wire." It includes a bracket and a pedal arm movably supported by the bracket. Springs provide resistance to the movement of the pedal arm toward the bracket, however the resistance provided does not copy the resistance of a purely mechanical system.

Cam followers biased against rotatable cam bodies are also well-known. For example, typical internal combustion engines include cam followers biased against rotatable cam bodies to open an close valves to combustion chambers. A cam follower extends to the cam body. A cam bias biases the cam follower against the cam body.

SUMMARY OF THE INVENTION

A bracket and a pedal arm is movably supported by the bracket. One of the bracket and the pedal arm presents a cam body. The other of the bracket and the pedal arm presents a cam follower. A cam bias interconnects one of the cam body and the cam follower to one of the bracket and the pedal arm to bias the cam follower and the cam body against each other. One of the cam body and the cam follower is rotatable. The cam bias interconnects the rotatable one of the cam body and the cam follower to one of the bracket and the pedal arm. The cam follower moves progressively along the cam body against resistance from said cam bias as said pedal arm moves toward said bracket for simulating the feel of a purely mechanical brake system.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the FIGS. 2-5, wherein like numerals indicate corresponding parts throughout the several views, an apparatus for simulating the feel of a purely mechanical brake system includes a bracket 120 including a central planar portion 122 having a lower end 124 and an upper end 126. The lower end 124 defines an aperture 128 for allowing a brake rod (not shown) to pass therethrough. The bracket 120 includes a left arm 130 and a right arm 132 spaced from each other and each extending perpendicularly upward from the upper end 126. Each of the left and right arms 130, 132 presents a flange 134 extending perpendicularly therefrom for mounting the bracket 120 to a firewall (not shown) of a vehicle.

Figure 2:
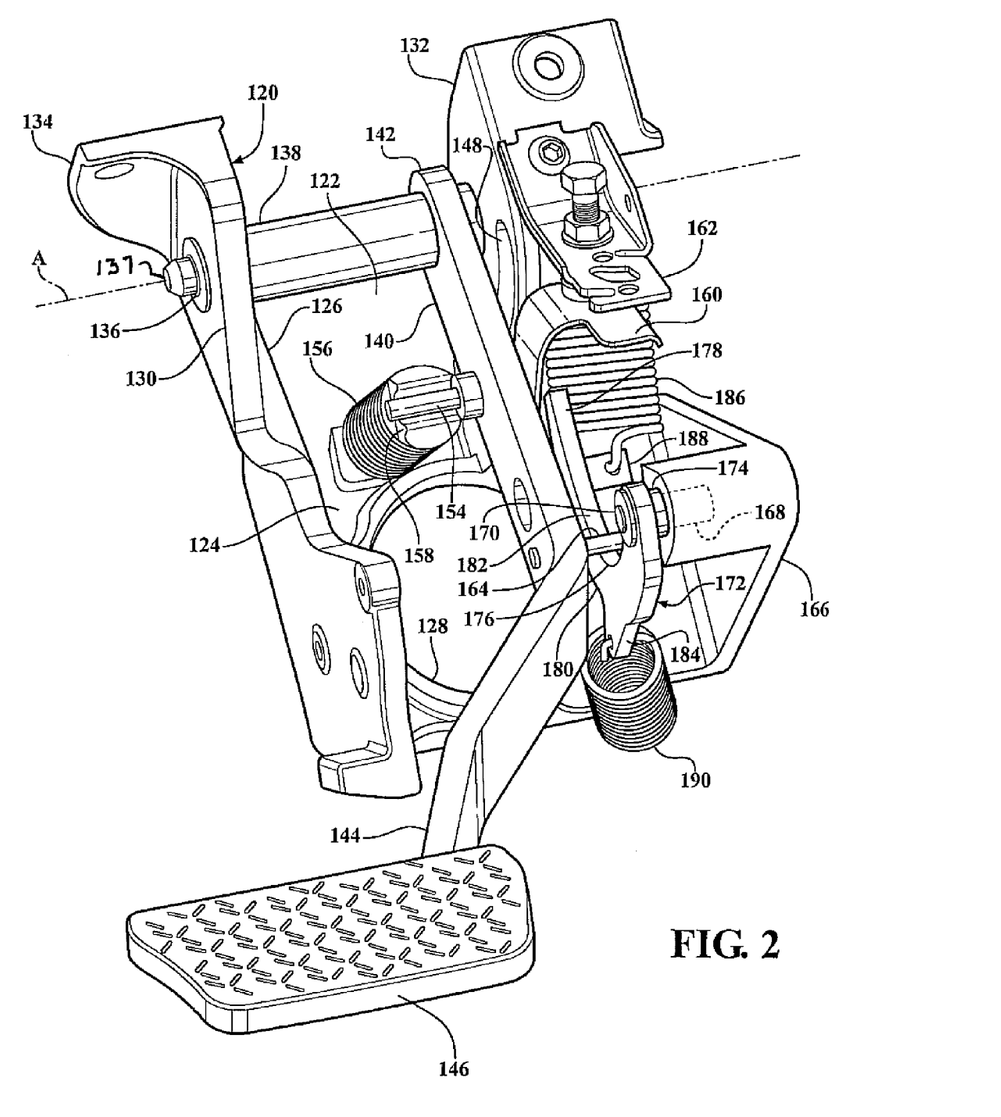
FIG. 2 is a perspective view of an apparatus according to a first embodiment of the present invention.
Figure 3:
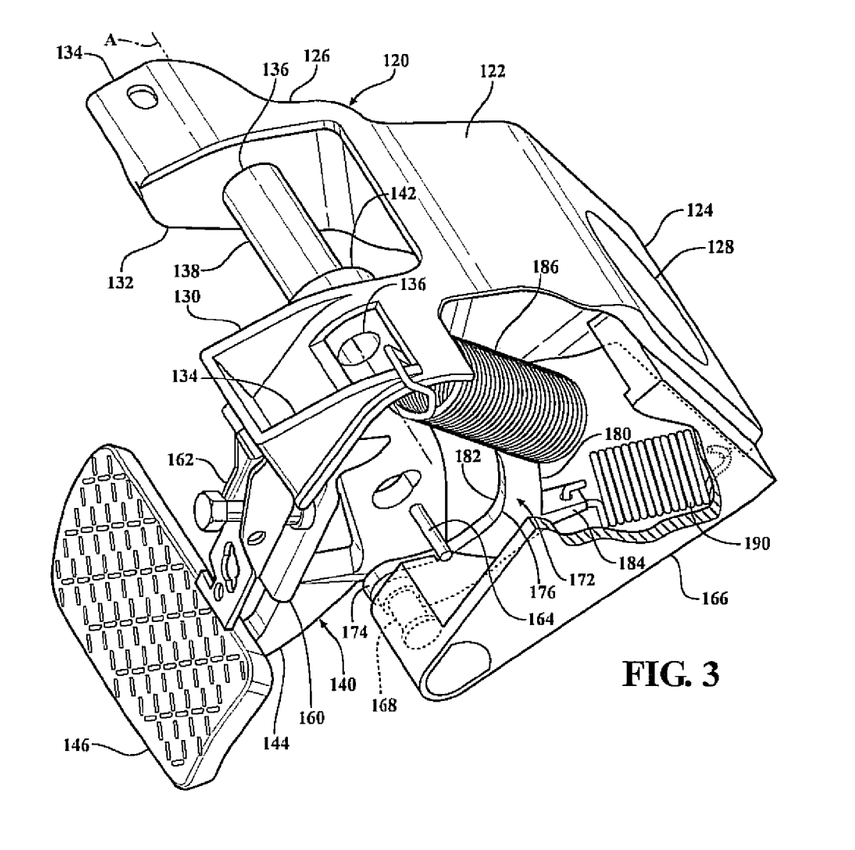
FIG. 3 is a back perspective view of an apparatus according to the first embodiment of the present invention.
Figure 4:
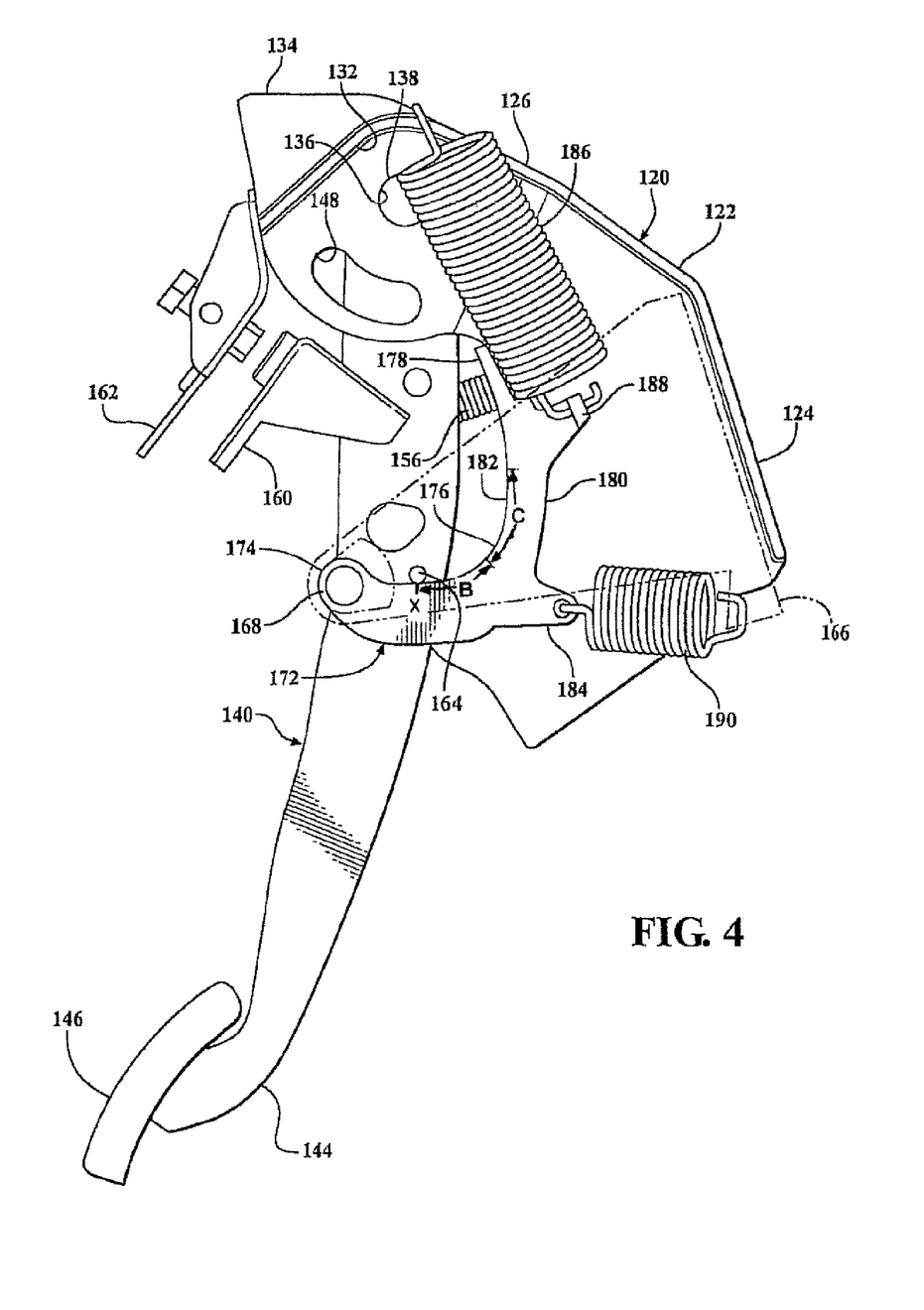
FIG. 4 is a side view of an apparatus according to the first embodiment of the present invention.

Each of the left and right arms 130, 132 define a pivot hole 136 extending perpendicularly therethrough. Each of the pivot holes 136 are concentric to each other along a pivot axis A. A pivot rod 137 is supported by and extends through each of the pivot holes 136. A pivot tube 138 surrounds and is rotatably supported by the pivot rod. A pedal arm 140 extends between a proximal end 142 fixed to the pivot tube 138 between the left arm 130 and the right arm 132 and a distal end 144. The distal end 144 of the pedal arm 140 has a pad 146 fixed thereto.

Figure 5:
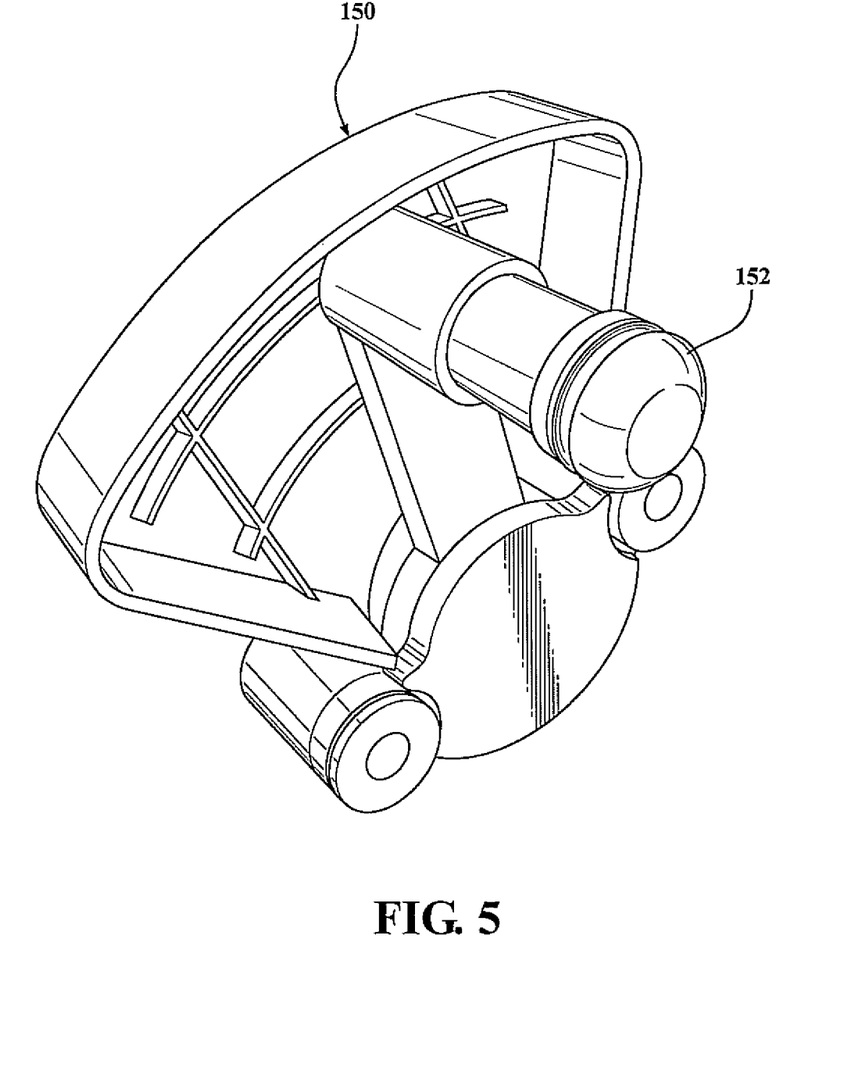
FIG. 5 is a position sensor according to the first embodiment of the present invention.

In a first embodiment such as the apparatus shown in FIG. 2, the right arm 132 defines a sensor slot 148. The sensor slot 148 is arcuate and is concentric with the pivot axis A. The apparatus includes a position sensor 150, and example of which is a non-contacting position sensor of the type manufactured by KSR and disclosed in U.S. Pat. No. 7,221,154. The position sensor 150 has a sensor follower 152 disposed in the sensor slot 148. A pedal return rod 154 extends perpendicularly from the pedal arm 140 and parallel with the pivot axis A. A pedal return spring 156 extends from the central planar portion 122 of the bracket 120 to the pedal return rod 154 to bias the pedal arm 140 to a home position. The pedal return spring 156 has a saddle 158 disposed between the pedal return rod 154 and the pedal return spring 156 for permitting relative rotation between the pedal return rod 154 and the pedal return spring 156.

A stop arm 160 extends from the pedal arm 140. A stop bracket 162 extends from the right arm 132 and engages the stop arm 160 in home position of the pedal arm 140 to prevent movement of the pedal arm 140 past home position. A cam follower 164 is cylindrical and extends perpendicularly from the pedal arm 140 and parallel to the pivot axis A. The bracket 120 includes a cam support 166 that extends perpendicularly upward from the lower end 124 of the bracket 120 adjacent the right arm 132. A boss 168 is cylindrical and extends perpendicularly from the cam support 166 and toward the pedal arm 140. The cam support 166 includes a cam pin 170 extending outward from the boss 168.

A cam body 172 extends arcuately between a pivot end 174 hingedly fixed to the cam pin 170 and through a trough point 176 to a traveling end 178 to present a crescent-shape having an inner surface 180 being convex and facing the bracket 120 and a cam surface 182 opposite the inner surface 180 being concave. The cam surface 182 is slidably disposed against the cam follower 164. The cam body 172 has a lower anchor 184 disposed adjacent the trough point 176. The lower anchor 184 extends radially outward from the inner surface 180. A cam puller 190 is a spring that interconnects the lower end 124 of the bracket 120 and the lower anchor 184 to pull the cam surface 182 of the cam body 172 against the cam follower 164. The cam body 172 has an upper anchor 188 disposed between the trough point 176 and the traveling end 178. The upper anchor 188 extends perpendicularly from the inner surface 180 and parallel with the pivot axis A. A cam bias 186 is a spring that interconnects the upper end 126 of the bracket 120 to the upper anchor 188 to pull the cam surface 182 of the cam body 172 against the cam follower 164.

The cam follower 164 contacts the cam surface 182 of the cam body 172 adjacent the pivot end 174 in the home position of the pedal arm 140. The cam follower 164 moves progressively along the cam surface 182 from adjacent the pivot end 174 toward the trough point 176 and then toward the traveling end 178 stretching the cam bias 186 and the cam puller 190 as the pedal arm 140 rotates with the pivot tube 138 toward the bracket 120 for simulating the feel of a purely mechanical brake system. The cam follower 164 moves progressively along the cam surface 182 relieving the cam bias 186 and relieving the cam puller 190 as the pedal arm 140 rotates with the pivot tube 138 away from the bracket 120 for simulating the feel of a purely mechanical brake system.

Figure 1:
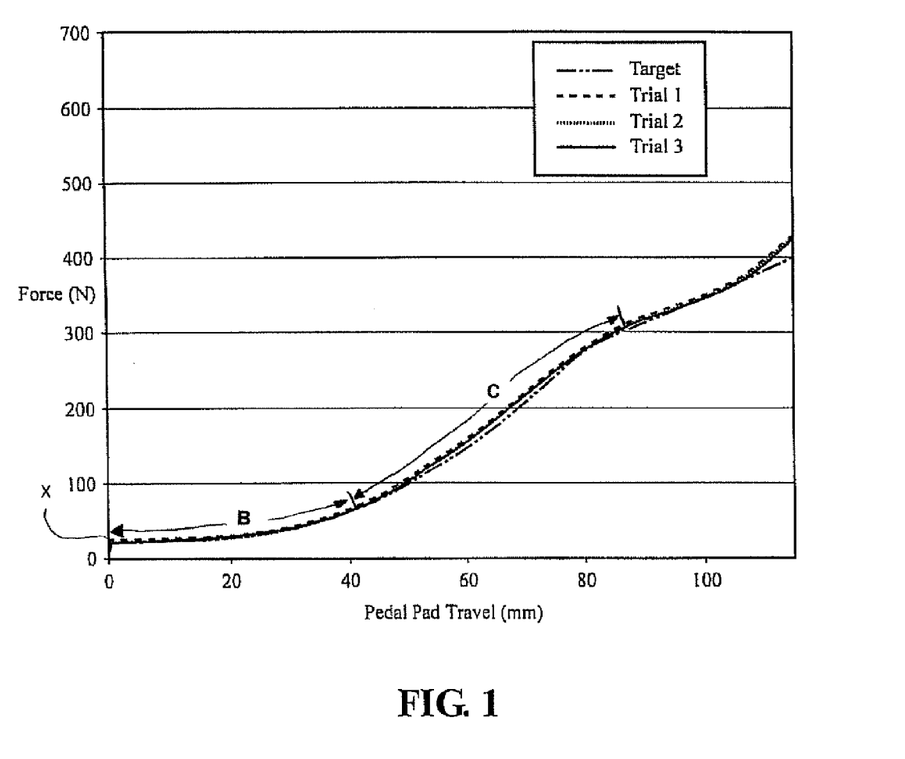
FIG. 1 is graph comparing the resistance against moving a pedal arm toward a bracket as the pedal arm approaches the bracket in a purely mechanical system with three trials of an apparatus according to the present invention.

As the cam follower 164 moves progressively along the cam surface 182 it moves from a rest position portion X, to first depression surface B to a second depression surface C. The rest position portion X along with the first depression surface B and the second depression surface C are shown in FIG. 4 along the cam surface 182. Correspondingly, the rest position portion X along with the first depression surface B and the second depression surface C and their corresponding forces are illustrated in FIG. 1.

Figure 6:
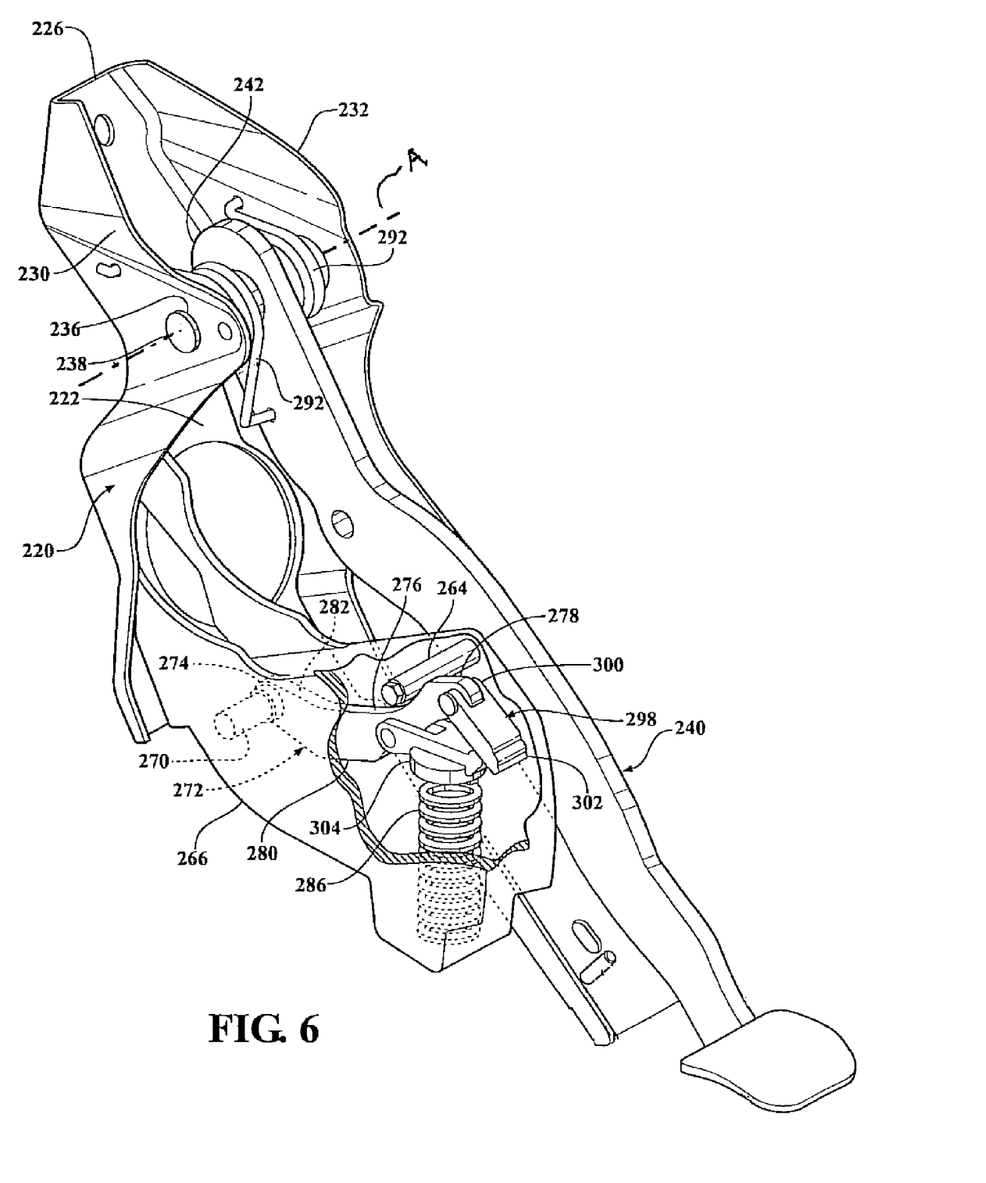
FIG. 6 is a perspective view of an apparatus according to a second embodiment of the present invention.

In a second embodiment such as the one shown in FIG. 6, a pair of torsion springs 292 are disposed about a pivot tube 238 and between a left arm 230 and a right arm 232. One of the torsion springs 292 is on each side of an upper portion 242 of a pedal arm 240. Each of the torsion springs 292 engages the pedal arm 240 and a different one of the right arm 232 and the left arm 230 for opposing the movement of the pedal arm 240 about the pivot tube 238 toward the bracket 220. The pair of springs 292 bias the pedal arm 240 to a home position of the pedal arm 240.

Figure 7:
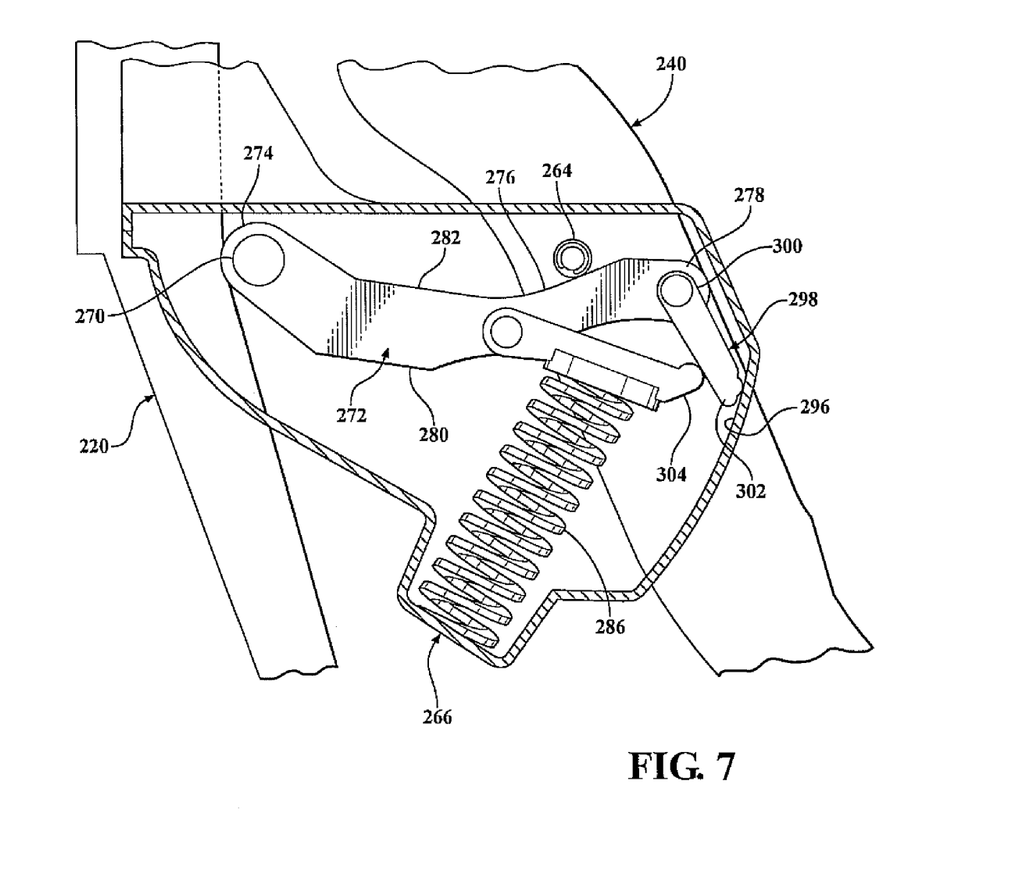
FIG. 7 is a partial sectional side view of an apparatus according to the second embodiment of the present invention.

A cam follower 264 extends perpendicularly from the pedal arm 240 parallel to the pivot axis A. A bracket 220 includes a cam support 266 extending from the lower end 224 of the bracket 220 adjacent the left arm 230. The cam support 266 presents a friction surface 296 that is arcuate. The bracket 220 includes a cam pin 270 extending from the cam support 266 parallel with the pivot axis A.

A cam body 272 extends arcuately between a pivot end 274 hingedly fixed to the cam pin 270 and through a trough point 276 and to a traveling end 278 to define a crescent-shape and a cam surface 282 being concave. The cam body 272 has a shoe 298 hingedly fixed thereto between the friction surface 296 and the cam bias 286 to provide frictional resistance to the movement of the cam body 272. The shoe 298 has a hinge end 300 being rotatably connected to the traveling end 278 of the cam body 272. The shoe 298 extends from the hinge end 300 to a friction end 302 slidably disposed against the friction surface 296. The cam body 272 has a spring retainer 304 rotatably connected to the cam body 272 between the traveling end 278 and the trough point 276 and disposed between the cam bias 286 and the shoe 298. A cam bias 286 interconnects the cam support 266 of the bracket 220 and the spring retainer 304 of the cam body 272.

Figure 8:
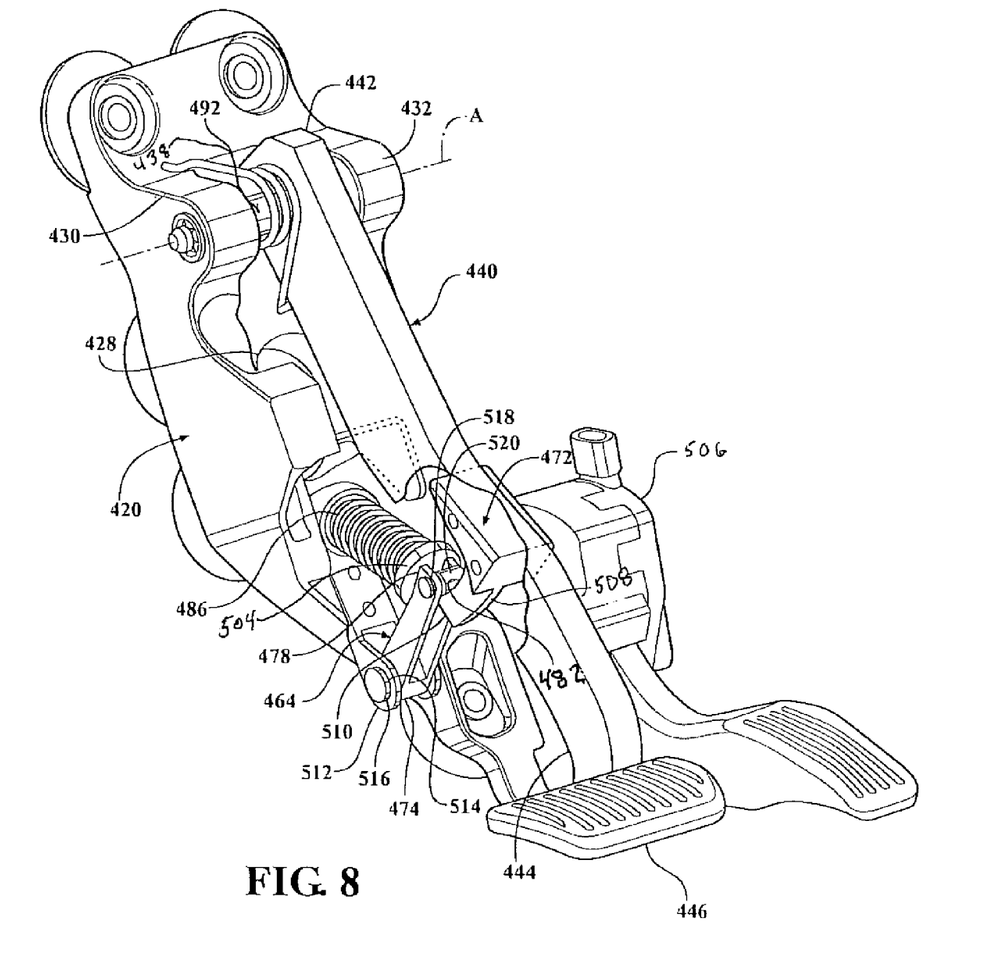
FIG. 8 is a perspective view of an apparatus according to a third embodiment of the present invention.

In a third embodiment such as the one shown in FIG. 8, the bracket 420 has an accelerator assembly 506 mounted thereon. A pair of torsion springs 492 are disposed about the pivot tube 438 and between the left arm 430 and the right arm 432. One of the torsion springs 492 is on either side of the pedal arm 440 and each engages the pedal arm 440 and a different one of the right arm 432 and the left arm 430 for opposing the movement of the pedal arm 440 about the pivot tube 438 toward the bracket 420 and biasing the pedal arm 440 to a home position of the pedal arm 440.

A cam body 472 extends arcuately from the pedal arm 440 between a first end 508 adjacent the pedal arm 440 and along an inner surface 476 to a second end 510 to present a crescent-shape. The inner surface 476 is convex facing the distal end 444 of the pedal arm 440 and a cam surface 482 opposite the inner surface 476 is concave.

The bracket 420 includes a pair of rocker pin arms 512 each extending upward from the lower end of the bracket 420. Each of the rocker pin arms 512 define a rocker pin hole 514 extending perpendicularly therethrough and parallel to the pivot axis A. Each of the rocker pin holes 514 are concentric to each other. The bracket 420 includes a rocker pin 516 rotatably disposed in and extending between the rocker pin holes 514.

A cam follower 464 extends from a pivot end 474 hingedly fixed to the rocker pin 516 of the bracket 420 to a traveling end 478. The traveling end 478 of the rocker arm defines a spring retainer 504 being dish-shaped. The traveling end 478 of the rocker arm also defines a pair of roller holes 518. The traveling end 478 has a roller 520 rotatably disposed in the roller holes 518 of the cam follower 464. The roller 520 of the cam body 472 is slidably disposed against the cam surface 482. A cam bias 486 is a spring interconnecting the bracket 420 and the spring retainer 504 of the cam follower 464 for pushing the cam follower 464 against the cam surface 482.

The roller 520 contacts the cam surface 482 of the cam body 472 adjacent the first end 508 in home position of the pedal arm 440. The roller 520 moves progressively along the cam surface 482 from adjacent the first end 508 toward the trough point and then toward the second end 510 compressing the cam bias 486 as the pedal arm 440 rotates with the pivot tube 438 toward the bracket 420 for simulating the feel of a purely mechanical brake system. The roller 520 moves progressively along the cam surface 482 toward the first end 508 relieving the cam bias 486 as the pedal arm 440 rotates about the pivot tube 438 toward home position for simulating the feel of a purely mechanical brake system.

Figure 9:
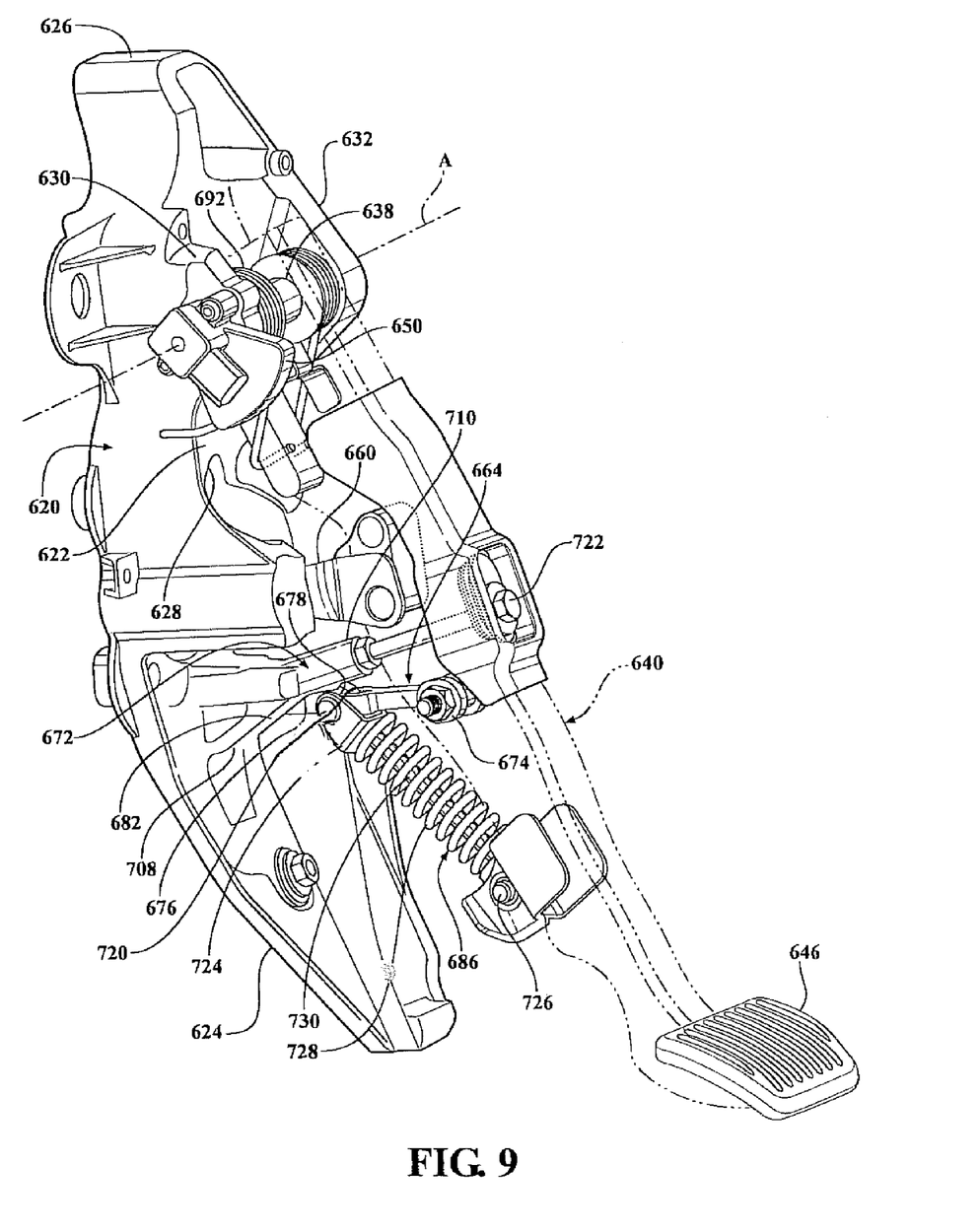
FIG. 9 is a perspective view of an apparatus according to a fourth embodiment of the present invention.

A fourth embodiment such as the one shown in FIG. 9 has a pair of torsion springs 692. Each of the torsion springs 692 is disposed about the pivot tube 638 and between the left arm 630 and the right arm 632. One of the torsion springs 692 is on either side of the pedal arm 640 and each engages the pedal arm 640 and a different one of the right arm 632 and the left arm 630 for opposing the movement of the pedal arm 640 about the pivot tube 638 toward the bracket 620 and biasing the pedal arm 640 to a home position of the pedal arm 640. A position sensor 650 is fixed to the left arm 630 for detecting angular position of the pedal arm 640. A switch bracket 660 extends from the pedal arm 640 to activate a brake lamp switch. A stop bolt 722 extends through the pedal arm 640 between the cam follower 664 and the proximal end 642 of the pedal arm 640 and adjacent the cam follower 664 and is fixed to the bracket 620 for preventing the pedal arm 640 from moving past the home position of the pedal arm 640.

Figure 10:
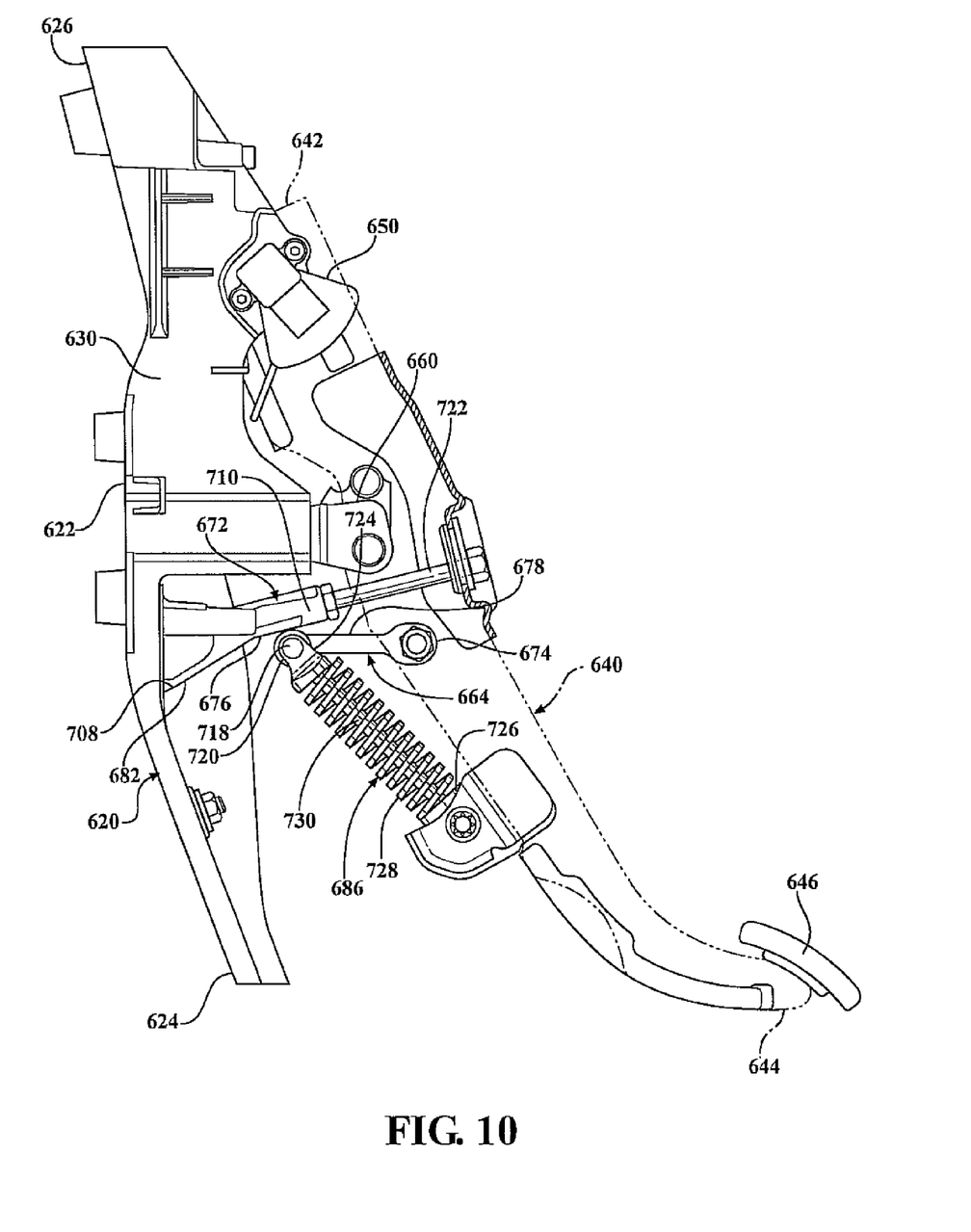
FIG. 10 is a side view of an apparatus according to the fourth embodiment of the present invention.

A cam body 672 extends from a first end 708 fixed to the lower end 624 of the bracket 620 toward the pedal arm 640 through a trough point 676 to a second end 710. The cam body 672 presents a cam surface 682 and the cam surface 682 is arcuate.

A cam follower 664 has a pivot end 674 hingedly fixed to the pedal arm 640 between the proximal end 642 and the distal end 644 and extends to a traveling end 678. The cam follower 664 includes a roller 720 rotatably mounted on the traveling end 678 of the cam follower 664 and slidably disposed against the cam surface 682.

A bias clevis 724 is hingedly mounted to the traveling end 678 of the cam follower 664. The pedal arm 640 has a bias retainer 726 hingedly mounted thereto between the pivot end 674 of the cam follower 664 and the distal end 644 of the pedal arm 640 and extending therefrom toward the bracket 620. A cam bias 686 interconnects the bias retainer 726 and the bias clevis 724. The cam bias 686 includes a bias spring 728 for pushing the cam follower 664 against the cam surface 682 and a spring collector 730 for retaining the bias spring 728.

The cam follower 664 contacts the cam surface 682 of the cam body 672 adjacent the second end 710 in home position of the pedal arm 640. The cam follower 664 moves progressively along the cam surface 682 from adjacent the second end 710 toward the trough point 676 and then toward the first end 708 compressing the bias spring 728 as the pedal arm 640 rotates with the pivot tube 638 toward the bracket 620. The cam follower 664 moves progressively along the cam surface 682 toward the first end 708 relieving the cam bias 686 as the pedal arm 640 rotates about the pivot tube 638 toward the home position for simulating the feel of a purely mechanical brake system.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. An electrical-mechanical brake apparatus for simulating the feel of a purely mechanical brake system including;
    a bracket and a pedal arm movably supported by said bracket,
    a position sensor for detecting depression of said pedal arm,
    one of said bracket and said pedal arm presenting a cam body,
    the other of said bracket and said pedal arm presenting a cam follower,
    a cam bias interconnecting one of said cam body and said cam follower to one of said bracket and said pedal arm to bias said cam follower and said cam body against each other,
    one of said cam body and said cam follower being rotatable and said cam bias interconnects the rotatable one of said cam body and said cam follower to one of said bracket and said pedal arm,
    the cam body having a rest position portion, a first depression surface with a first radius of curvature, and a second depression surface with a second radius of curvature less than the first radius of curvature wherein the amount of force required for depression increases as said cam follower moves sequentially upwards from the rest position to the first depression surface to the second depression surface for simulating the feel of a purely mechanical brake system.

2. An apparatus as set forth in claim 1 wherein said cam follower extends from said pedal arm and said cam body extends from said bracket and is rotatable and said cam bias interconnects said bracket to said cam body.

3. An apparatus as set forth in claim 2 wherein a cam puller interconnects said cam body and said bracket for pulling a cam surface against said cam follower, wherein said cam surface comprises said rest position portion, said first depression surface, and said second depression surface.

4. An apparatus as set forth in claim 3 wherein said bracket includes a cam support extending from said bracket and presenting a boss and said bracket includes a cam pin extending outward from said boss and rotatably supporting said cam body.

5. An apparatus as set forth in claim 4 wherein said cam body extends arcuately between a pivot end hingedly fixed to said cam pin and through a trough point to a traveling end to present a crescent-shape having the cam surface being concave and slidably disposed against said cam follower and said cam body has a lower anchor disposed adjacent said trough point and extending radially outward from an inner surface and said cam puller is a spring interconnecting said bracket and said lower anchor of said cam body to push said cam surface of said cam body against said cam follower and said cam body has an upper anchor disposed between said trough point and said traveling end and extends perpendicularly from said inner surface and said cam bias is a spring and interconnects said bracket to said upper anchor of said cam body.

6. An apparatus as set forth in claim 5 wherein a pedal return rod extends perpendicularly from said pedal arm parallel with a pivot axis and a pedal return spring extends from said bracket to said pedal return rod to bias said pedal arm to a home position and said pedal return spring has a saddle disposed between said pedal return rod and said pedal return spring for permitting relative rotation between said pedal return rod and said pedal return spring and said apparatus includes the position sensor fixed to said bracket for measuring a position of said pedal arm.

7. An apparatus as set forth in claim 1 wherein said bracket includes a central planar portion having a lower end and an upper end and said lower end defines an aperture for allowing a brake rod to pass therethrough and said bracket includes a left arm and a right arm spaced from each other and each extending perpendicularly upward from said upper end and each of said right and left arms presents a flange extending perpendicularly therefrom for mounting said bracket to a firewall of a vehicle and each of said left and right arms define a pivot hole extending perpendicularly therethrough and each of said pivot holes being concentric to each other along a pivot axis and said bracket includes a pivot rod supported by and extending through each of said pivot holes and a pivot tube surrounding and rotatably supported by the pivot rod and said pedal arm extends between a proximal end fixed to said pivot tube between said left arm and said right arm and a distal end having a pad fixed thereto.

\* \* \* \* \*

UNITED STATES PATENT AND TRADEMARK OFFICE
CERTIFICATE OF CORRECTION

| | | |
|---|---|---|
| PATENT NO. | : 8,474,348 B2 | Page 1 of 1 |
| APPLICATION NO. | : 13/021288 | |
| DATED | : July 2, 2013 | |
| INVENTOR(S) | : Jarek Soltys et al. | |

It is certified that error appears in the above-identified patent and that said Letters Patent is hereby corrected as shown below:

On the Title Page, Item (63) Related Application Data
Insert --Continuation in part of application No. 12/858,766, filed on Aug. 18, 2010--.

Signed and Sealed this
Seventeenth Day of June, 2014

Michelle K. Lee
*Deputy Director of the United States Patent and Trademark Office*